United States Patent [19]

Boman et al.

[11] Patent Number: 5,791,617
[45] Date of Patent: Aug. 11, 1998

[54] STOWABLE VEHICLE CONTAINER HOLDER

[76] Inventors: Larry Stuart Boman, 4134 Ruby, Ypsilanti, Mich. 48197; Dennis Schimmelpfenneg, 6682 Brookshire, Canton, Mich. 48187

[21] Appl. No.: 738,198

[22] Filed: Oct. 25, 1996

[51] Int. Cl.⁶ .................................................. A47K 1/09
[52] U.S. Cl. ........................................ 248/311.2; 224/926
[58] Field of Search ........................... 248/311.2, 150, 248/312.1, 315, 316.1, 316.2, 154, 313, 310, 149, 172, 309.1, 314, 286.1, 296.1, 312; 224/926, 281, 282

[56] References Cited

U.S. PATENT DOCUMENTS

| | | | |
|---|---|---|---|
| 4,530,480 | 7/1985 | Pratt | 248/311.2 |
| 4,733,908 | 3/1988 | Dykstra et al. | 248/311.2 X |
| 4,738,423 | 4/1988 | DiFilippo et al. | 248/311.2 |
| 4,826,058 | 5/1989 | Nakayama | 248/311.2 X |
| 4,828,211 | 5/1989 | McConnell et al. | 248/311.2 |
| 4,892,281 | 1/1990 | DiFilippo et al. | 248/311.2 |
| 4,907,775 | 3/1990 | Lorence et al. | 248/311.2 |
| 5,052,728 | 10/1991 | Fukumoto | 248/926 X |
| 5,060,899 | 10/1991 | Lorence et al. | 248/311.2 |
| 5,141,194 | 8/1992 | Burgess et al. | 248/311.2 |
| 5,191,679 | 3/1993 | Harper | 248/311.2 X |
| 5,195,711 | 3/1993 | Miller et al. | 248/311.2 |
| 5,228,611 | 7/1993 | Yabuya | 248/311.2 X |
| 5,259,579 | 11/1993 | Schneider | 248/313 X |
| 5,297,767 | 3/1994 | Miller et al. | 248/311.2 |
| 5,395,084 | 3/1995 | Ikuma | 224/926 X |
| 5,618,018 | 4/1997 | Baniak | 248/311.2 |
| 5,620,228 | 4/1997 | Ito et al. | 248/311.2 X |

*Primary Examiner*—Ramon O. Ramirez
*Assistant Examiner*—Stephen S. Wentsler
*Attorney, Agent, or Firm*—David B. Kelley

[57] ABSTRACT

A stowable container holder for an automotive vehicle has a stationary sheath mounted in the vehicle interior, a sliding sheath slidably disposed within the stationary sheath for generally vertical telescoping movement between a retracted position housed in the stationary sheath and an extended position extending from the stationary sheath, and a receptacle member sliding disposed in the sliding sheath for telescoping movement between a stowed position within the sliding sheath and a deployed position extending from the sliding sheath, the receptacle member rotatable only from the deployed position to a substantially horizontal container holding position in which a container may be stored. The sliding sheath is held to the stationary sheath when the sliding sheath is in the extended position, and the receptacle member is temporarily locked to the sliding sheath when the receptacle member is in a stowed position.

17 Claims, 5 Drawing Sheets

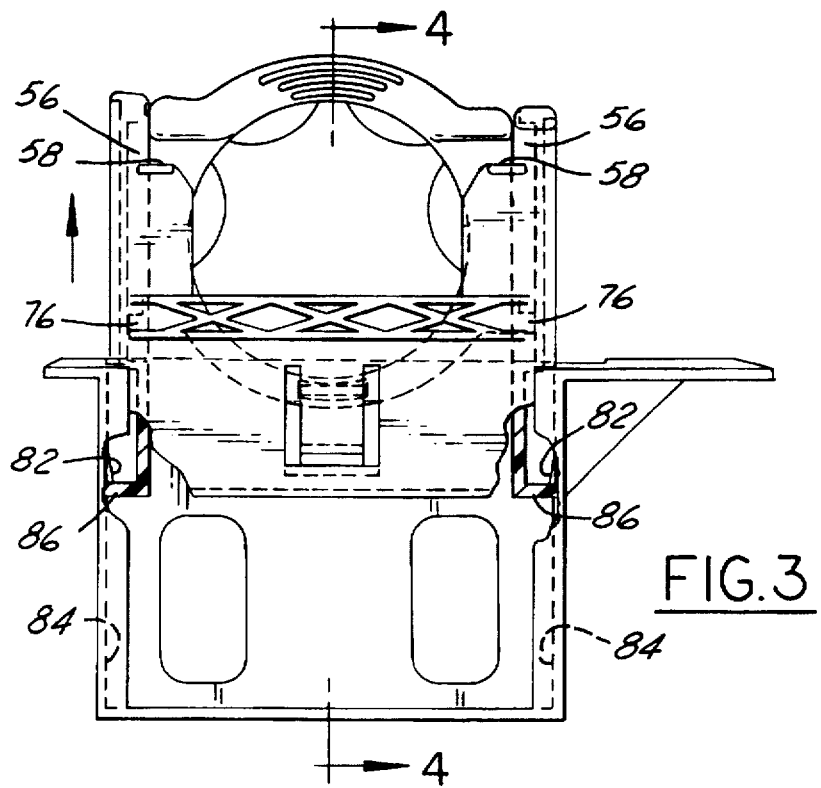
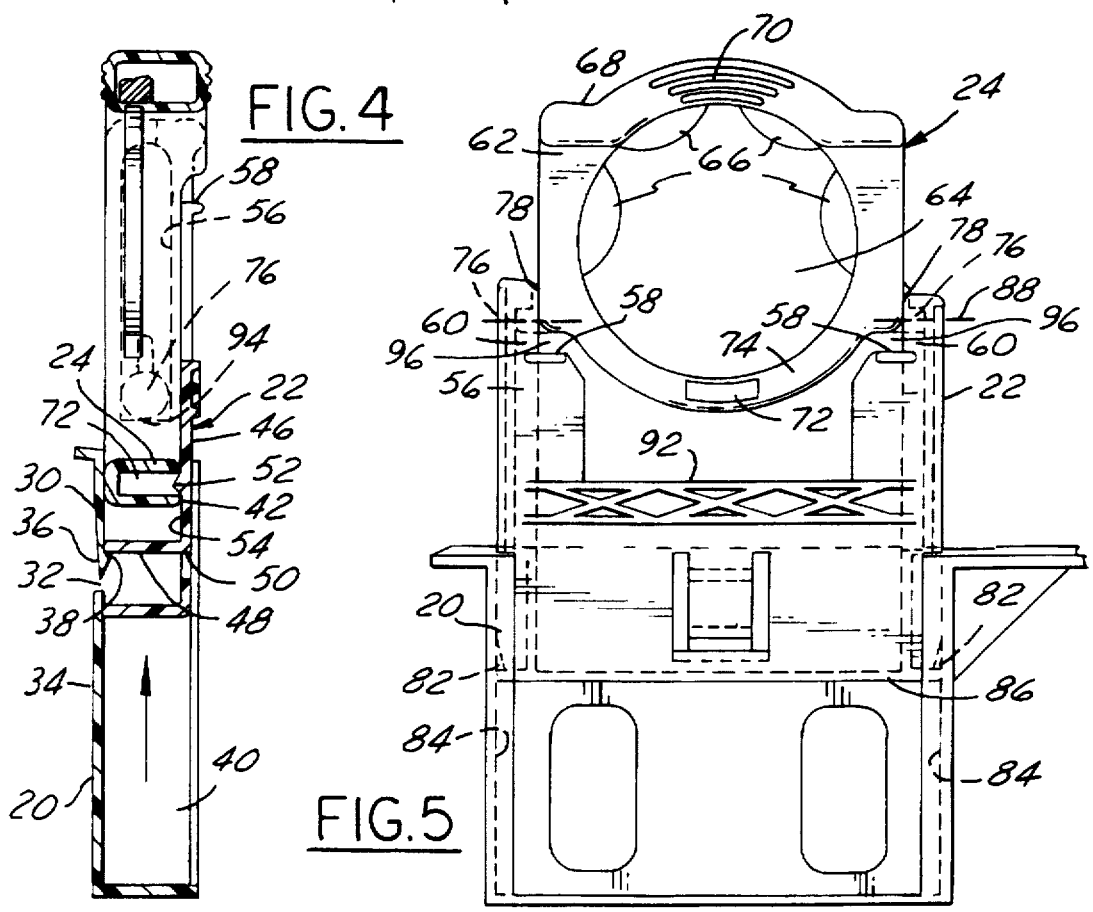

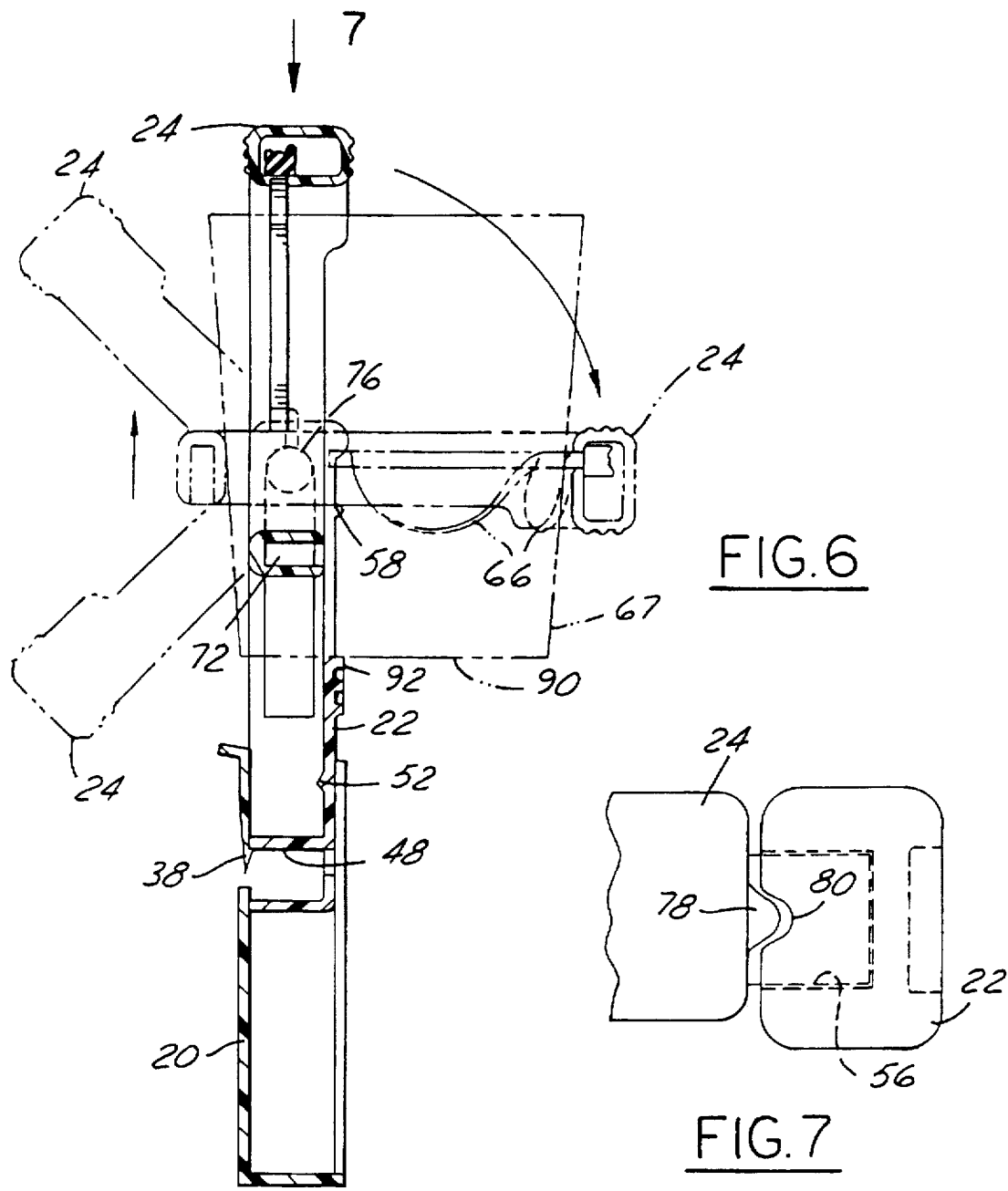

STOWABLE VEHICLE CONTAINER HOLDER

FIELD OF THE INVENTION

The present invention relates generally to vehicle container holders and, more particularly, to retractable container holders.

BACKGROUND OF THE INVENTION

Container holders are known in the art for providing a convenient, temporary storage location for a beverage container within an automotive vehicle. Collapsible and retractable container holders have been devised, such as in U.S. Pat. No. 4,530,480 (Pratt) and U.S. Pat. No. 5,141,194 (Burgess et al.), which have structure allowing an expanded position in which a container may be supported and a collapsed, retracted position in which the container support members are stored out of sight from within the vehicle passenger compartment. Other cupholder devices have evolved, including those disclosed in U.S. Pat. Nos. 4,733,908 (Dykstra et al), 4,828,211 (McConnell et al.), 4,907,775 (Lorence et al.), and 5,191,679 (Harper), all of which include provision for a vertically stowable container holder member which deploys to a generally horizontal position in order to retain a beverage container. The aforementioned devices, as well as others in the art, however, employ many parts to achieve the stowed and deployed positions, greatly adding to both the manufacturing expense and assembly time. In addition, the container holder members are rotatable only through 90°, which lends them to damage when intruded upon in a deployed position.

SUMMARY OF THE INVENTION

In response to the disadvantages of the related art, the present invention provides an improved, stowable container holder for an automotive vehicle having a vehicle interior. The stowable container holder comprises a stationary sheath mounted in the vehicle interior and a sliding sheath slidably disposed within the stationary sheath for generally vertically telescoping movement therefrom between a retracted position housed in the stationary sheath and an extended position extending from the stationary sheath. Within the sliding sheath, a receptacle member is slidably disposed for telescoping movement with respect to the sliding sheath between a stowed position therein and a deployed position extending therefrom. The receptacle member is rotatable only from the deployed position to a substantially horizontal container holding position. The receptacle member is rotatable at least 180° around its axis of rotation to permit flexibility when impacted. The container holder has sheath lock means for locking the sliding sheath to this stationary sheath when the sliding sheath is in the extended position, and receptacle lock means for locking the receptacle member to the sliding sheath when the receptacle member is in the stowed position.

In a preferred embodiment, the sheath lock means comprises a stationary sheath cantilever in a slot in the stationary sheath substantially flush therewith, and a stub on a free end of the stationary sheath cantilever projecting into a slideway defined by the stationary sheath. Interactive with the stationary sheath cantilever is a sliding sheath cantilever in a cut in a side of the sliding sheath opposite from the stationary sheath cantilever across the slideway and substantially flush with the side. The sliding sheath cantilever has an extension member on an unattached end thereof extending substantially across the slideway for interaction with the stub of the stationary sheath cantilever. The extension member forces the stub out of the slideway to permit the extension member to move therepast when the sliding sheath is moved from the retracted position to the extended position, the stub moving back into the slideway for abutting movement with the extension member to hold the sliding sheath in the extending position. A lock rib on the sliding sheath cantilever interacts with a recess on the receptacle member to act as a means for holding the receptacle member in the stowed position.

An advantage of the present invention is a stowable container holder with a versatile receptacle member capable of rotation through greater than 90° when moving to a horizontal position.

Another advantage of the present invention is a stowable container holder having few parts.

Yet another advantage is a stowable container holder which is inexpensive to manufacture and easy to assemble.

A feature of the present invention is a receptacle member having rotation knobs which fit into tracks allowing it to slide vertically within a telescoping sheath and to rotate through at least 180° around an axis through the rotation knobs.

Another feature of the present invention are integrally molded cantilever members on sheaths which have relative movement therebetween, the cantilever members having detent members for interaction therebetween.

BRIEF DESCRIPTION OF THE DRAWINGS

These and other objects, advantages, and features of the present invention will be apparent to those skilled in the container holder art upon reading the following description with reference to the accompanying drawings, in which:

FIG. 3 is a side view of the stowable container holder of the present invention showing a sliding sheath in an extended position;

FIG. 4 is a side view of the stowable container holder taken along lines 4—4 of FIG. 3;

FIG. 5 is a front view of the container holder as shown in FIG. 3 but showing a receptacle member moved to a deployed position;

FIG. 6 is a side view of a container holder according to the present invention showing a receptacle member moved from the deployed position of FIG. 5 to a container holding position;

FIG. 7 is a partial plan view taken along line 7 of FIG. 6; and

DETAILED DESCRIPTION OF THE PREFERRED EMBODIMENT

Figure 1:
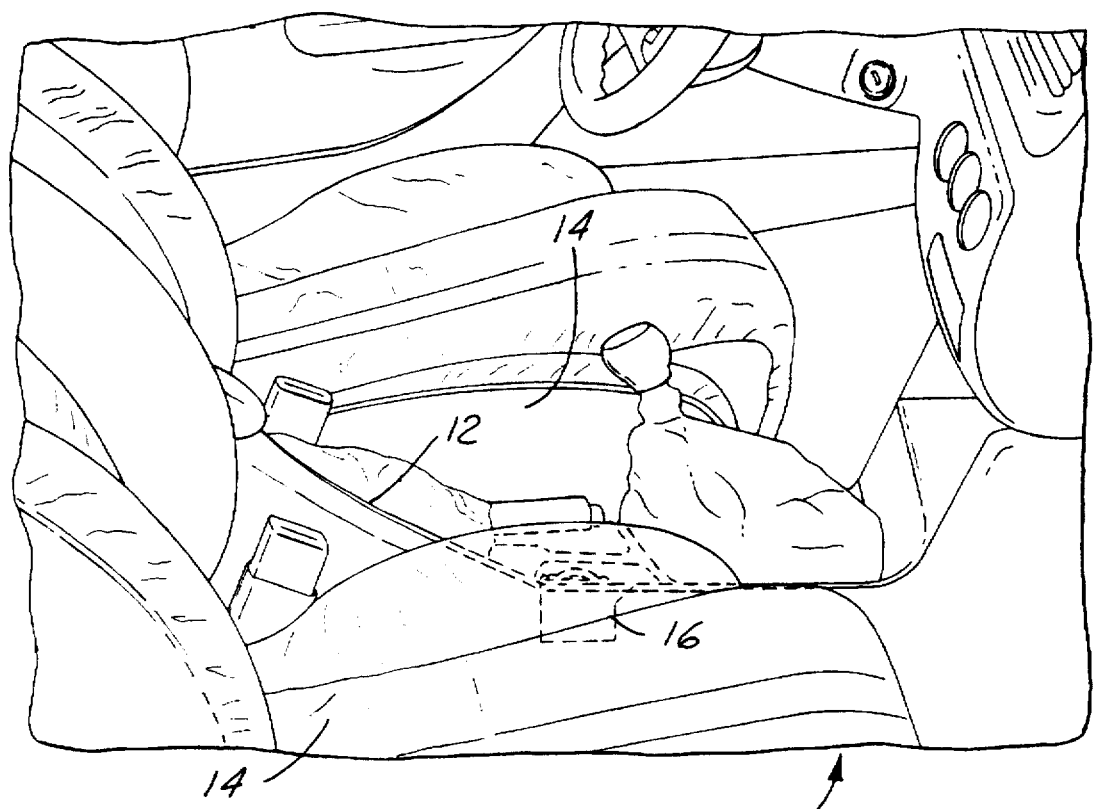
FIG. 1 is a perspective view of a vehicle interior showing a stowable container holder according to the present invention mounted therein.

Referring now to the drawings, and in particular to FIG. 1 thereof, an automotive vehicle interior 10 is shown with a console 12 mounted between a pair of bucket seats 14. The console 12 has mounted therein a stowable container holder 16 which, as further described below, can be used for holding beverage containers or the like which are typically consumed by drivers or passengers in an automotive vehicle. Those skilled in the art will recognize that the stowable container holder 16 can be mounted in locations other than that shown in FIG. 1, and that the console 12 may likewise be located at other locations throughout the vehicle interior 10.

Figure 2:
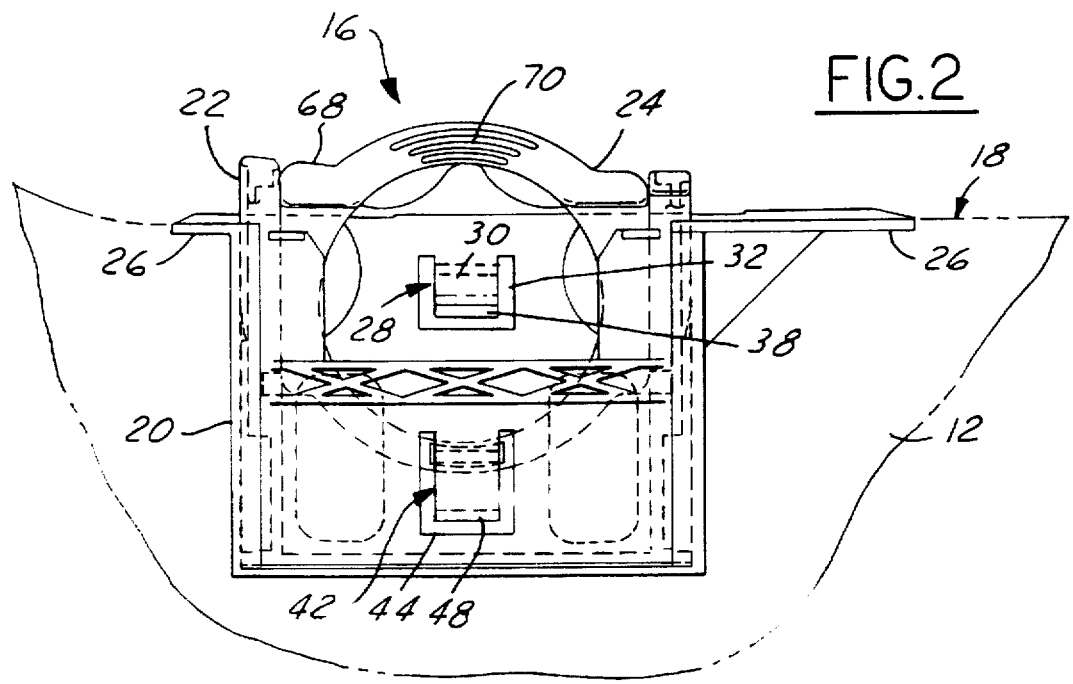
FIG. 2 is a close-up side view of the stowable container holder of FIG. 1 showing a sliding sheath of the container holder in a retracted position.

Turning now to FIG. 2, the stowable container holder 16 is shown mounted in the console 12 substantially below a surface 18 thereof. The stowable container holder 16 has three primary components, including a stationary sheath 20, a sliding sheath 22, and a receptacle member 24. The stationary sheath 20 has bracket members 26 for mounting and retention to the surface 18. The stationary sheath 20 also has an integral, flexible detent member 28 comprising a stationary sheath cantilever 30 in a slot 32 (FIG. 2), the stationary sheath cantilever 30 being substantially flush with a side 34 of the stationary sheath 20 (FIG. 4). On a free end 36 of the stationary sheath cantilever 30 is a stub 38, preferably triangularly shaped in cross-section, which extends into a slideway 40 defined by the stationary sheath 20 (FIG. 4).

The sliding sheath 22 is disposed within the slideway 40 for generally vertical slidable movement between a retracted position housed in the slideway (FIG. 2) and an extended position extending from the sliding sheath (FIGS. 3 and 4). The sliding sheath 22 has an integral sliding sheath cantilever 42 in a cut 44 on a side 46 of the sliding sheath 22 (FIGS. 2 and 4). The sliding sheath cantilever 42 is across the slideway 40 from the stationary sheath cantilever 30 and is substantially flush with the side 46. In addition, the sliding sheath cantilever 42 has an extension member 48 (FIGS. 2 and 4) on an unattached end 50 thereof, the extension member 48 extending substantially across the slideway 40 for interaction with the stub 38 of the stationary sheath cantilever 30 for locking the sliding sheath 22 to the stationary sheath 20 when the sliding sheath is in the extended position (FIGS. 3 and 4). The sliding sheath cantilever 42 also has a lock rib 52 on a slideway facing surface 54 (FIGS. 2 and 4). The sliding sheath 22 also has a pair of lateral tracks 56, each having a ledge 58 proximate an upper end 60 thereof, for supporting the receptacle member 24, as described below (FIGS. 3–6).

The receptacle member 24, as seen in FIG. 5, has a frame 62 with a circular aperture 64 therein for receiving a container 67 (FIG. 6). Extending into the aperture 64 are tabs 66 which are generally flexible and serve to both retain the container 67 within the aperture 64, as well as allow for varying sizes of containers. On a top edge 68 of the frame 62 is a grasp tab 70 which extends above the surface 18 (FIG. 1) to allow a user to easily grasp the receptacle member for deployment, as further described below. A recess 72 in a lower edge 74 of the receptacle member 24 interacts with the lock rib 52 of the sliding sheath 22 for locking the receptacle member 24 to the sliding sheath 22 when the receptacle member is in a stowed position, as seen in FIGS. 2–4. The receptacle member 24 has a pair of opposed rotation knobs 76 engaged in the lateral tracks 56 to allow telescoping movement of the receptacle member 24 with respect to the sliding sheath 22 between the stowed position contained within the sliding sheath and a deployed position extending from the sliding sheath 22, as seen in FIG. 5. The receptacle member 24 is only rotatable from the deployed position (FIG. 5) to a container holder position (FIG. 6) in which it is substantially horizontal and capable of receiving a container therein.

As seen in FIGS. 5 and 7, the receptacle member 24 has detent knobs 78 proximate the rotation knobs 76. The detent knobs engage horizontal indentations 80 in the sliding sheath 22 just above the ledges 58 to provide a predetermined resistance to rotation of the receptacle member from the container holder position (FIG. 6) to the deployed position (FIG. 5)

In operation, the container holder 16 is stowed in the position shown in FIG. 2 when not in use. In that position, the sliding sheath 22 is in the retracted position and the receptacle member 24 is in the stowed position therein, as seen in FIG. 2. When it is desired to store a beverage container in the container holder 16, the tab 70 on the receptacle member 24 is grasped and pulled in a generally upward direction, upward being toward the top of FIGS. 2–4. Initially, the extension member 48 of the sliding sheath 22 is below the stub 38 within the slideway 40 (not shown). As the sliding sheath 22 is moved upward, the extension member engages the stub 38 and, since the stub is triangularly shaped, the extension member pushes thereagainst, causing the stationary sheath cantilever 30 to flex outwardly. This action allows the extension member to move past the stub 38, and once therepast, further upward movement is prevented by wedges 82, which extend into lateral guideways 84 thereby stopping a bottom 86 of the sliding sheath 20 (FIGS. 3 and 5). With the sliding sheath 22 in the extended position, having the receptacle member 24 in the stowed position (FIG. 3), the receptacle member 24 can be further pulled upward in a telescoping manner with respect to the sliding sheath 22 until the rotational knobs 76 reach the ends 60 of the tracks 56 thereby achieving the deployed position (FIGS. 5 and 6). From the deployed position, the receptacle member 24 can be rotated about an axis 88 through the rotational knob 76 (FIG. 5) until reaching a container support position (FIG. 6) in which the receptacle member rests on shoulder 58 of the sliding sheath 22 and the detent knobs 78 engage the indentations 80 (FIG. 7). In the container support position, the receptacle member 24 can receive a container 67 therein, a bottom 90 of the container resting on a container support edge 92 of the sliding sheath 22 (FIG. 6). The container 67 fits through the aperture 64 and the receptacle member 24 thereby depressing the flexible tabs 66 which provide lateral support (FIG. 6).

When the container 67 is removed from the aperture 64, the receptacle member can be rotated from the container support position back to the deployed position (FIG. 6). From the deployed position, the receptacle member can be telescopically moved downward so that the rotation knobs slide within the tracks 56 till reaching a bottom 94 at which time the receptacle member 24 is the stowed position with the recess 72 once again engaged with the lock rib 52 of the sliding sheath 22 (FIG. 4). Further downward pressure on the receptacle member results in the extension member 48 pushing over stub 38 causing the stationary sheath cantilever 30 to move outwardly so that the extension member 48 and the sliding sheath 22 can move downwardly into the slideway 40.

Figure 8:
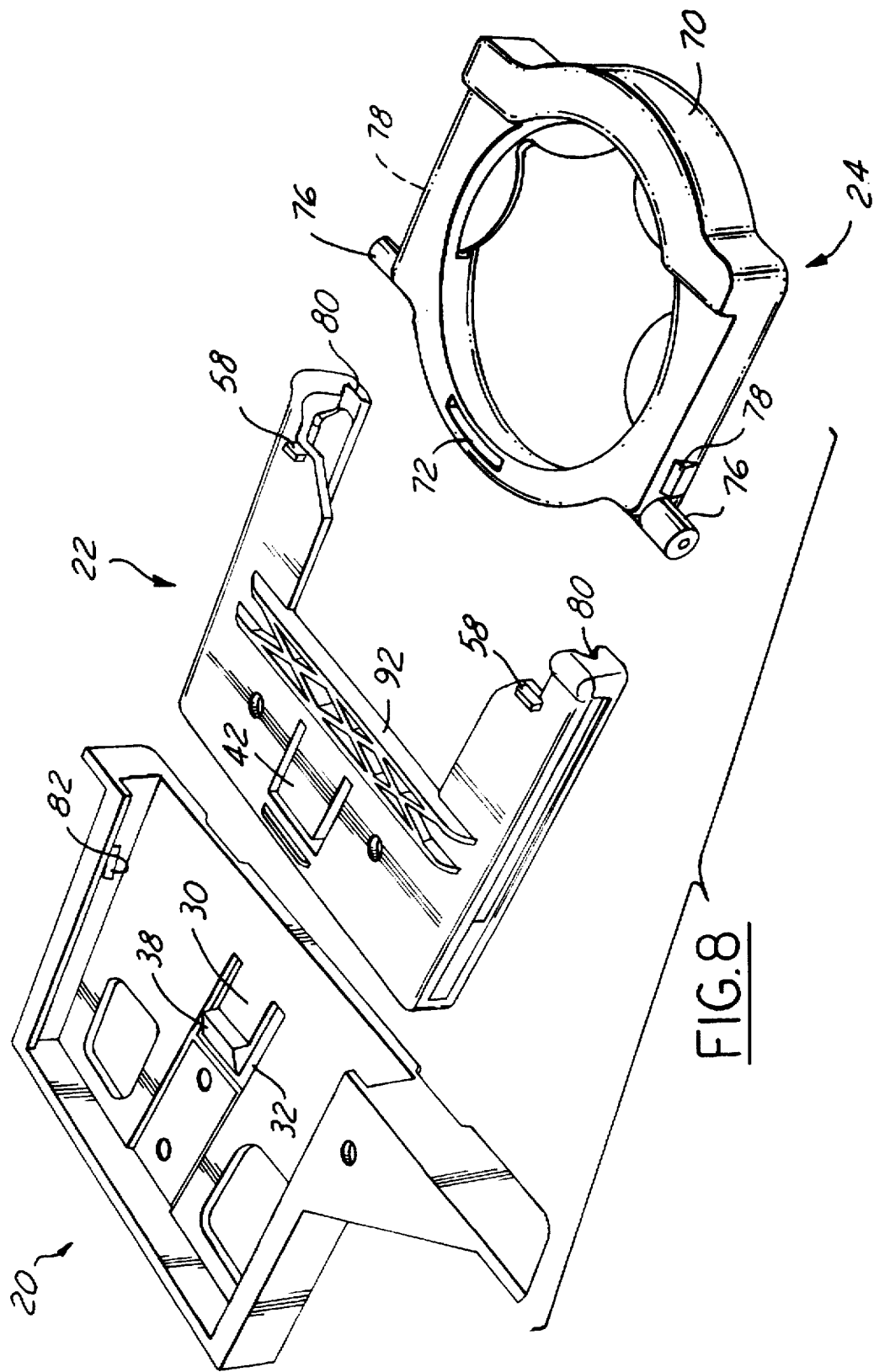
FIGS. 8 and 9 are exploded perspective views of opposite sides of the present invention.
Figure 9:
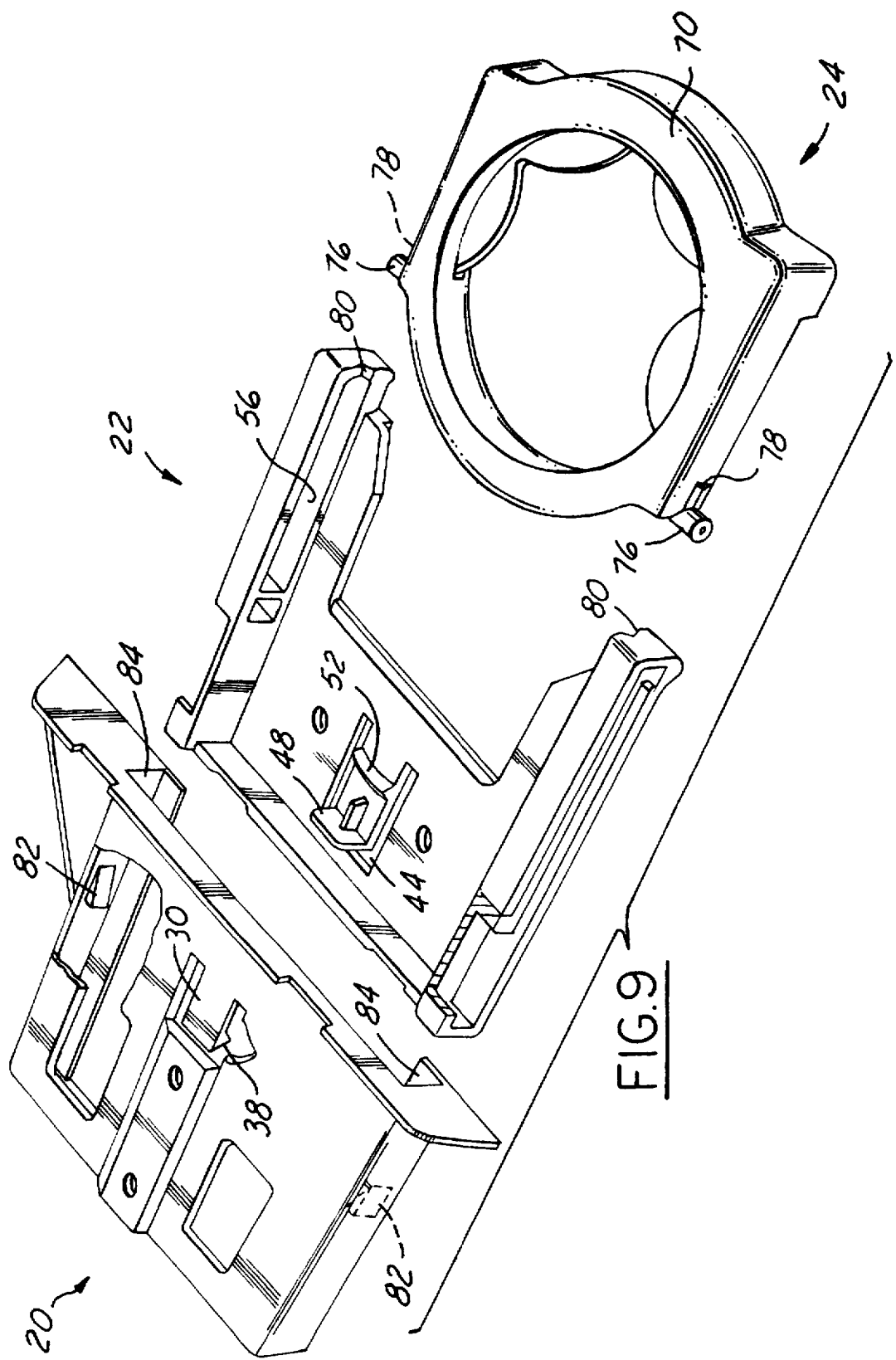

Particularly advantageous in the present invention is the small number of parts required for the invention. In particular, only three parts are needed, including the stationary sheath 20, the sliding sheath 22, and the receptacle member 24 (FIGS. 8 and 9). All other required features, as described above, can be integrally molded into one of the aforementioned parts, except for the tabs 66, thereby minimizing manufacturing expense and assembly time. Preferably, the stationary sheath 20, the sliding sheath 22, and the receptacle member 24 are molded of a hard plastic material. The tabs 66 can be made of a suitable flexible material; for example, polypropylene. The sliding sheath 22 preferably has an opening 96 (FIG. 5) through which the edge 74 of the receptacle 24 can rotate. Such a feature allows the receptacle member to rotate through greater than 90° about the axis 88 so that when the receptacle member 24 is in the container holding position without a container therein, inadvertent application of a force to the receptacle member 24 will not cause breakage thereof, but rather will move the receptacle member to a rotated position. This is a particular advantage over prior container holding devices, since restriction of movement of the receptacle member in such devices is typically limited to 90° and application of a force thereto will cause breakage of the receptacle member. Preferably, a receptacle member of the present invention can rotate about the axis 88 through at least 180°.

Although the preferred embodiment of the present invention has been disclosed, various changes and modifications may be made without departing from the scope of the invention as set forth in the appended claims.

We claim:

1. A stowable container holder for an automotive vehicle having a vehicle interior, the holder comprising:
   (1) a stationary sheath, defining a slideway, mountable in the vehicle interior and having an integral, flexible detent member projecting into the slideway;
   (2) a sliding sheath slidably disposed within the slideway for generally vertical telescoping movement with respect to the stationary sheath between a retracted position housed in the slideway and an extended position extending from the stationary sheath;
      (i) the sliding sheath having an integral catch member thereon interactive with the detent member for locking the sliding sheath to the stationary sheath when the sliding sheath is in the extended position,
      (ii) the catch member capable of forcing the detent member out of the slideway to permit the catch member to move therepast upon application of a predetermined force to the sliding sheath;
      (iii) the sliding sheath also having an integral lock rib thereon; and
      (iv) a pair of lateral tracks; and
   (3) a receptacle member having:
      (i) a pair of opposed rotation knobs respectively disposed in the pair of lateral tracks to allow telescoping movement of the receptacle member with respect to the sliding sheath between a stowed position contained within the sliding sheath and a deployed position extending from the sliding sheath, the receptacle member rotatable only from the deployed position to a substantially horizontal container holding position;
      (ii) a recess interactive with the lock rib for locking the receptacle member to the sliding sheath when the receptacle member is in the stowed position.

2. The stowable container holder according to claim 1 wherein the pair of rotation knobs permits rotation of the receptacle member through approximately 180° of rotation around an axis through the pair of rotation knobs.

3. The stowable container holder according to claim 1 wherein the sliding sheath has a ledge proximate an upper end of each of the pair of lateral tracks for supporting the receptacle member when in the container holding position.

4. The stowable container holder according to claim 1 wherein the receptacle member has a tab extendible above a surface surrounding the container holder in the vehicle interior when the receptacle is in the stowed position and the sliding sheath is in the retracted position, the tab allowing the receptacle member to be grasped.

5. The stowable container holder according to claim 1 wherein the receptacle member has size varying means for allowing retention of containers of varying size.

6. A stowable container holder for an automotive vehicle having a vehicle interior, the holder comprising:
   (1) a stationary sheath, defining a slideway therein, mountable in the vehicle interior and having an integral, flexible detent member comprising a stationary sheath cantilever in a slot in the stationary sheath substantially flush therewith, and a stub on a free end of the stationary sheath cantilever projecting into the slideway;
   (2) a sliding sheath disposed within the slideway for generally vertical slidable movement with respect to the stationary sheath between a retracted position housed in the slideway and an extended position extending from the stationary sheath,
      (i) the sliding sheath having an integral sliding sheath cantilever in a cut in a side of the sliding sheath opposite the slideway from the stationary sheath cantilever and substantially flush with the side, the sliding sheath cantilever having an extension member on an unattached end thereof extending substantially across the slideway for interaction with the stub of the stationary sheath cantilever for locking the sliding sheath to the stationary sheath when the sliding sheath is in the extended position,
      (ii) the extension member capable of forcing the stub out of the slideway to permit the extension member to move therepast upon application of a predetermined force to the sliding sheath;
      (iii) a lock rib on the sliding sheath cantilever; and
      (iv) a pair of lateral tracks; and
   (3) a receptacle member having:
      (i) a pair of opposed rotation knobs respectively disposed in the pair of lateral tracks to allow telescoping movement of the receptacle member with respect to the sliding sheath between a stowed position contained within the sliding sheath and a deployed position extending from the sliding sheath, the receptacle member rotatable only from the deployed position to a substantially horizontal container holding position; and
      (ii) a recess interactive with the lock rib for locking the receptacle member to the sliding sheath when the receptacle member is in the stowed position.

7. The stowable container holder according to claim 6 wherein the stub on the cantilever portion of the detent member is triangular shaped.

8. The stowable container holder according to claim 6 wherein the pair of rotation knobs permits rotation of the receptacle member through approximately 180° of rotation around an axis through the pair of rotation knobs.

9. The stowable container holder according to claim 6 wherein the sliding sheath has a ledge proximate an upper end of each of the pair of lateral tracks for supporting the receptacle member when in the container holding position.

10. The stowable container holder according to claim 6 wherein the receptacle member has a tab extendible above a surface surrounding the container holder in the vehicle interior when the receptacle is in the stowed position and the sliding sheath is in the retracted position, the tab allowing the receptacle member to be grasped.

11. The stowable container holder according to claim 6 wherein the receptacle member has size varying means for allowing retention of containers of varying size.

12. A stowable container holder for an automotive vehicle having a vehicle interior, the holder comprising:

a stationary sheath mountable in the vehicle interior;

a sliding sheath slidably disposed within the stationary sheath for generally vertical telescoping movement therefrom between a retracted position housed in the stationary sheath and an extended position extending from the stationary sheath;

sheath lock means for locking the sliding sheath to the stationary sheath when the sliding sheath is in the extended position;

a receptacle member slidably disposed in the sliding sheath for telescoping movement with respect thereto between a stowed position within the sliding sheath and a deployed position extending from the sliding sheath, the receptacle member rotatable only from the deployed position to a substantially horizontal container holding position; and receptacle lock means for locking the receptacle member to the sliding sheath when the receptacle member is in the stowed position.

13. The stowable container holder according to claim 12 wherein the receptacle member has a pair of opposed rotation knobs respectively disposed in a pair of lateral tracks in the sliding sheath.

14. The stowable container holder according to claim 13 wherein the pair of knobs permits rotation of the receptacle member through approximately 180° of rotation around an axis through the pair of rotation knobs.

15. The stowable container holder according to claim 13 wherein the sliding sheath has a ledge proximate an upper end of each of the pair of tracks for supporting the receptacle member when in the container holding position.

16. The stowable container holder according to claim 12 wherein the receptacle member has a tab extendible above a surface surrounding the container holder in the vehicle interior when the receptacle is in the stowed position and the sliding sheath is in the retracted position, the tab allowing the receptacle member to be grasped.

17. The stowable container holder according to claim 12 wherein the receptacle member has size varying means for allowing retention of containers of varying size.

* * * * *